US012734854B2

(12) United States Patent
Kim et al.

(10) Patent No.: US 12,734,854 B2
(45) Date of Patent: Sep. 15, 2026

(54) HYDRO BUSHING

(71) Applicants: Hyundai Motor Company, Seoul (KR); Kia Corporation, Seoul (KR); PYUNG HWA INDUSTRIAL CO., LTD., Daegu (KR)

(72) Inventors: Young Ho Kim, Gunpo-Si (KR); Yong Hyun Ryu, Seoul (KR); Dae Un Sung, Incheon (KR); Dong Suk Shin, Hwaseong-Si (KR); Young Bin Ju, Daegu (KR); Ho Sung Lee, Daegu (KR)

(73) Assignees: Hyundai Motor Company, Seoul (KR); Kia Corporation, Seoul (KR); Pyung Hwa Industrial Co., Ltd., Daegu (KR)

( * ) Notice: Subject to any disclaimer, the term of this patent is extended or adjusted under 35 U.S.C. 154(b) by 693 days.

(21) Appl. No.: 18/197,585

(22) Filed: May 15, 2023

(65) Prior Publication Data

US 2024/0198749 A1 Jun. 20, 2024

(30) Foreign Application Priority Data

Dec. 14, 2022 (KR) ........................ 10-2022-0174284

(51) Int. Cl.
*B60G 13/00* (2006.01)

(52) U.S. Cl.
CPC .. *B60G 13/003* (2013.01); *B60G 2204/41062* (2013.01)

(58) Field of Classification Search
None
See application file for complete search history.

(56) References Cited

U.S. PATENT DOCUMENTS

| | | | | |
|---|---|---|---|---|
| 2,347,629 A * | 4/1944 | Hale | D05B 75/04 | 112/258 |
| 5,657,510 A * | 8/1997 | Satori | F16F 13/14 | 16/2.2 |
| 9,038,997 B2 * | 5/2015 | Bradshaw | F16F 13/16 | 296/190.07 |
| 10,215,252 B2 * | 2/2019 | Parr | F16F 13/103 | |
| 11,009,097 B2 * | 5/2021 | Rawlings | F16F 13/22 | |
| 2014/0333018 A1 * | 11/2014 | Cha | F16F 13/1463 | 267/219 |

(Continued)

FOREIGN PATENT DOCUMENTS

| | | | |
|---|---|---|---|
| KR | 100809035 B1 * | 3/2008 | B60K 5/12 |
| KR | 101243617 B1 * | 3/2013 | B60G 7/04 |

(Continued)

OTHER PUBLICATIONS

KR-100809035-B1: English Machine Translation (Year: 2008).*
KR-101243617-B1: English Machine Translation (Year: 2013).*
WO-0212748-A1: English Machine Translation (Year: 2002).*

*Primary Examiner* — Melanie Torres Williams
(74) *Attorney, Agent, or Firm* — MORGAN, LEWIS & BOCKIUS LLP

(57) ABSTRACT

A hydro bushing includes a main body configured for absorbing shocks using a sealed fluid; a side stopper including a shock absorber and having a hollow cylindrical structure; and a housing fixing the side stopper and the main body, wherein the main body and the side stopper are separable from each other.

17 Claims, 4 Drawing Sheets

(56) References Cited

U.S. PATENT DOCUMENTS

2021/0276391 A1 9/2021 Nam et al.

FOREIGN PATENT DOCUMENTS

| | | | | |
|---|---|---|---|---|
| KR | 10 1585403 | B1 | 1/2016 | |
| KR | 10 2033983 | B1 | 10/2019 | |
| KR | 10 2021 0112595 | A | 9/2021 | |
| WO | WO-0212748 | A1 * | 2/2002 | ............. F16F 1/387 |
| WO | WO 2009 100205 | A1 | 8/2009 | |

* cited by examiner

HYDRO BUSHING

CROSS-REFERENCE TO RELATED APPLICATION(S)

The present application claims priority to Korean Patent Application No. 10-2022-0174284 filed on Dec. 14, 2022, the entire contents of which is incorporated herein for all purposes by this reference.

BACKGROUND OF THE PRESENT DISCLOSURE

Field of the Present Disclosure

The present disclosure relates to a hydro bushing.

Description of Related Art

A suspension system of a vehicle may be a device that absorbs shocks or vibrations generated while driving so that the shocks or vibrations are not directly transmitted to a vehicle body or an occupant to affect ride and stability of the vehicle. A suspension system applied to a vehicle may be a MacPherson strut, a double wishbone, a multilink, a coupled torsion beam axle (CTBA), or the like, depending on a structure thereof.

In the instant case, the CTBA may be applied to many vehicles due to advantages thereof, such as a simple structure, a small number of components, and a small occupation space. The CTBA may be provided with a bushing having an elastic modulus in a site of being coupled to a vehicle body to provide a more comfortable ride by buffering some of load or vibrations generated in front and rear directions of a vehicle.

The bushing may act as using elastic deformation thereof to absorb shocks, vibrations, noise, or the like generated by a suspension or an engine, along with a role of supporting the CTBA and a body-side connection portion.

Recently, a hydro bushing sealing a fluid capable of implementing an active shock absorber function to have appropriate degree of rigidity suitable for driving conditions of a vehicle has been developed and provided. However, because the conventional hydro bushing may be manufactured as an integral type bushing, there may be problems such as crack propagation, a difficulty in improving performance, or the like.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing a hydro bushing for fixing by separately manufacturing a side stopper and a main body.

According to an aspect of the present disclosure, a hydro bushing includes a main body configured for absorbing shocks using a sealed fluid; a side stopper including a shock absorber and having a hollow cylindrical structure; and a housing fixing the side stopper and the main body, wherein the main body and the side stopper are separable from each other.

The side stopper may include an upper plate and a lower plate, including a disk shape, wherein the shock absorber may be disposed and coupled between the upper plate and the lower plate, and wherein the upper plate, the lower plate, and the shock absorber may form an internal hole.

The main body may include an internal pipe formed to protrude to one side thereof, and a protrusion of the internal pipe may be inserted into the internal hole of the side stopper.

The internal pipe may protrude as long as a sum of a thickness of the lower plate of the side stopper and a thickness of the shock absorber.

An internal hole of at least one of the upper plate, the lower plate, or the shock absorber may have a diameter, different from a diameter of a remaining internal hole.

The diameter of the internal hole formed in the lower plate and the shock absorber may be at least wider than an external diameter of the internal pipe.

The diameter of the internal hole formed in the upper plate may be narrower than the external diameter of the internal pipe, and an end portion of the internal pipe may be in contact with and supported by the upper plate.

The upper plate may further include a first protrusion protruding toward the shock absorber on a portion of the lower surface.

The housing may further include a curled portion bent in a "U" shape surrounding a surface of an external circumference of the lower plate of the side stopper.

The main body may be coupled in a fluid. The main body may include a hollow cylindrical internal pipe including an anti-vibration unit absorbing vibrations externally; an external pipe surrounding the internal pipe and sealing a fluid in an internal space formed with an external surface of the internal pipe; and a middle pipe forming a movement path of the fluid therein.

The middle pipe may be in an internal contact with the internal pipe, and may be in external contact with the external pipe.

The middle pipe may form an upper swaging and a lower swaging, bent outward, on both end portions in a longitudinal direction, wherein the upper swaging and the lower swaging are in an internal contact with the external pipe.

The middle pipe may further include an auxiliary stopper protruding onto an opposite side of the side stopper.

The auxiliary stopper may further include a second protrusion including an embossed structure.

An anti-vibration unit of the main body and a shock absorber of the side stopper may be formed of different materials.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

Figure 1:
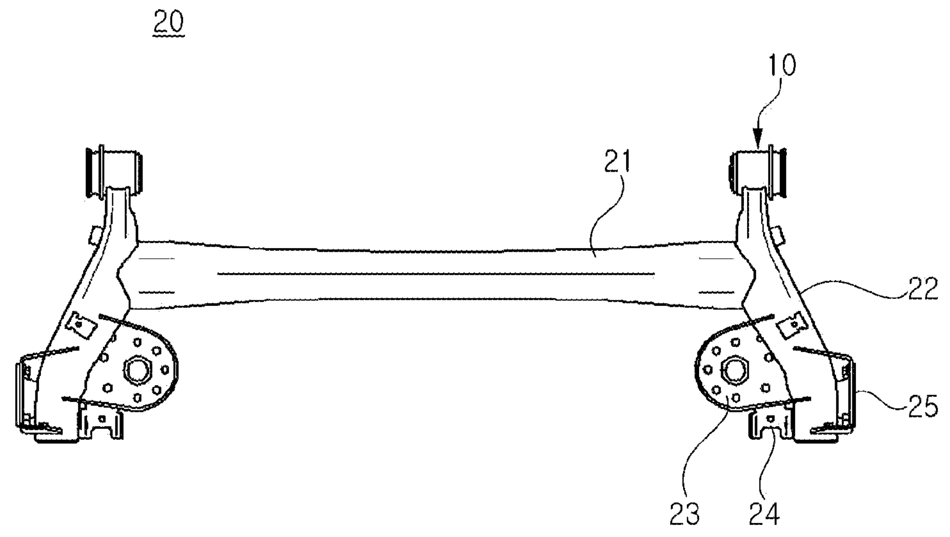
FIG. 1 is a view exemplarily illustrating a coupled torsion beam axle (CTBA) to which a hydro bushing is mounted according to an exemplary embodiment of the present disclosure.

It may be understood that the appended drawings are not necessarily to scale, presenting a somewhat simplified representation of various features illustrative of the basic principles of the present disclosure. The specific design features of the present disclosure as included herein, including, for example, specific dimensions, orientations, locations, and shapes will be determined in part by the particularly intended application and use environment.

In the figures, reference numbers refer to a same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Because the present disclosure may have various changes and may have various exemplary embodiments of the present disclosure, specific embodiments may be illustrated in the drawings and described in detail. However, this may not be intended to limit the present disclosure to specific embodiments, it should be understood to include all modifications, equivalents and substitutes included in the spirit and scope of the present disclosure.

Terms such as first, second, etc. may be used to describe various elements, but the elements should not be limited by the terms. The above terms may be used only for distinguishing one component from another. For example, without departing from the scope of the present disclosure, a first component may be referred to as a second component, and similarly, a second component may also be referred to as a first component. The term "and/or" may include a combination of a plurality of related listed items or any of a plurality of related listed items.

The terms used in the present application may be only used to describe specific embodiments, and may not be intended to limit the present disclosure. The singular expression may include the plural expression unless the context clearly dictates otherwise. In the present application, terms such as "comprise" or "have" may be intended to designate that a feature, number, step, operation, component, part, or combination thereof described in the specification exists, but one or more other features. It should be understood that this does not preclude the existence or addition of numbers, steps, operations, components, parts, or combinations thereof.

Unless defined otherwise, all terms used herein, including technical or scientific terms, include the same meaning as commonly understood by one of ordinary skill in the art to which the present disclosure belongs. Terms such as those defined in a commonly used dictionary should be interpreted as having a meaning consistent with the meaning in the context of the related art, and should not be interpreted in an ideal or excessively formal meaning unless explicitly defined in the present application. does not Hereinafter, various embodiments of the present disclosure will be described in more detail with reference to the accompanying drawings.

FIG. 1 is a view exemplarily illustrating a coupled torsion beam axle (CTBA) 20 to which a hydro bushing 10 is mounted according to an exemplary embodiment of the present disclosure.

The CTBA 20 may include a torsion beam 21, a trailing arm 22, a spring seat 23, a shock absorber bracket 24, and a hydro bushing 10.

The torsion beam 21 may be disposed to extend between a left wheel and a right wheel in a width direction of a vehicle body. For example, the torsion beam 21 may be mounted on a left rear wheel and a right rear wheel, but is not limited thereto. The torsion beam 21 may be provided on left and right sides using torsional elastic force, and may suppress independent movement of the trailing arm 22 to which the wheels of the vehicle body are connected, by the elastic force.

The trailing arms 22 may be provided on both end portions of the torsion beam 21 in a longitudinal direction of the vehicle body. A spindle bracket 25 for mounting the wheels of the vehicle body may be fixed to external side surfaces of the trailing arm 22 in the width direction of the vehicle body. The trailing arm 22 may be coupled to the spring seat 23 to which a spring is mounted, and to the shock absorber bracket 24 to which a shock absorber is mounted, and may support the spring seat 23 and the shock absorber bracket 24.

The trailing arm 22 may be supported on the vehicle body through the hydro bushing 10 provided on a front end portion of the vehicle body of the trailing arm 22. When vibrations or shocks are generated in the vehicle body, vibrations or shocks transmitted from a ground to the vehicle body may be absorbed by the spring and the shock absorber. Furthermore, the hydro bushing 10 may prevent vibrations and shocks from being transmitted to the vehicle body by controlling the vibrations and shocks. The hydro bushing 10 may prevent vibrations and shocks from being transmitted to the vehicle body by use of viscosity of fluid and buffering properties of rubber.

A hydro bushing 10 according to an exemplary embodiment of the present disclosure may have a configuration in which a side stopper and a main body are coupled by a housing. A hydro bushing 10 according to the related art may have a side stopper and a main body which may be integrated. In the case that a crack occurs in the side stopper of the integrated hydro bushing 10, there may be a problem that the crack may propagate toward the main body. Furthermore, although efforts are being made to improve durability of the side stopper by increasing hardness of a material (e.g., rubber) for the integrated hydro bushing 10, there may be a problem that performance of the hydro bushing 10 absorbing vibrations and shock may deteriorate. A side stopper and a main body may be manufactured separately and may thus be individually optimized according to each function and purpose thereof in a hydro bushing 10 according to an exemplary embodiment of the present disclosure. Therefore, durability of the hydro bushing 10 may also be improved, together with functionality thereof.

Figure 2:
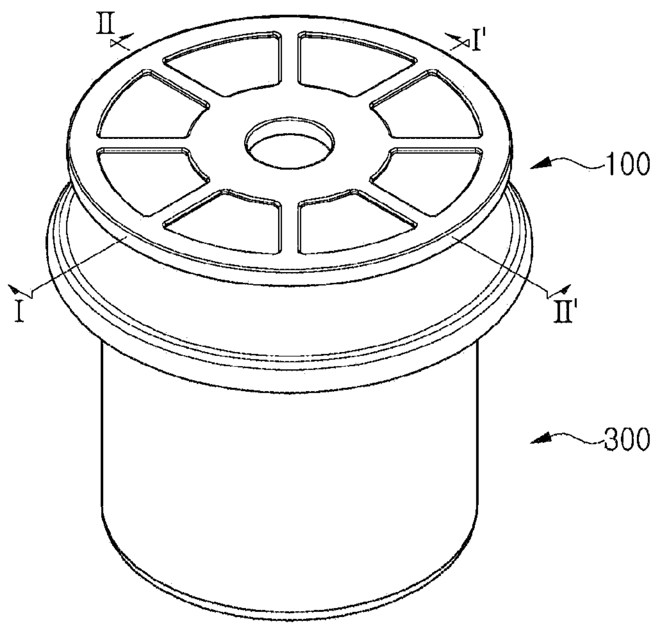
FIG. 2 is a perspective view of a hydro bushing according to an exemplary embodiment of the present disclosure.
Figure 3:
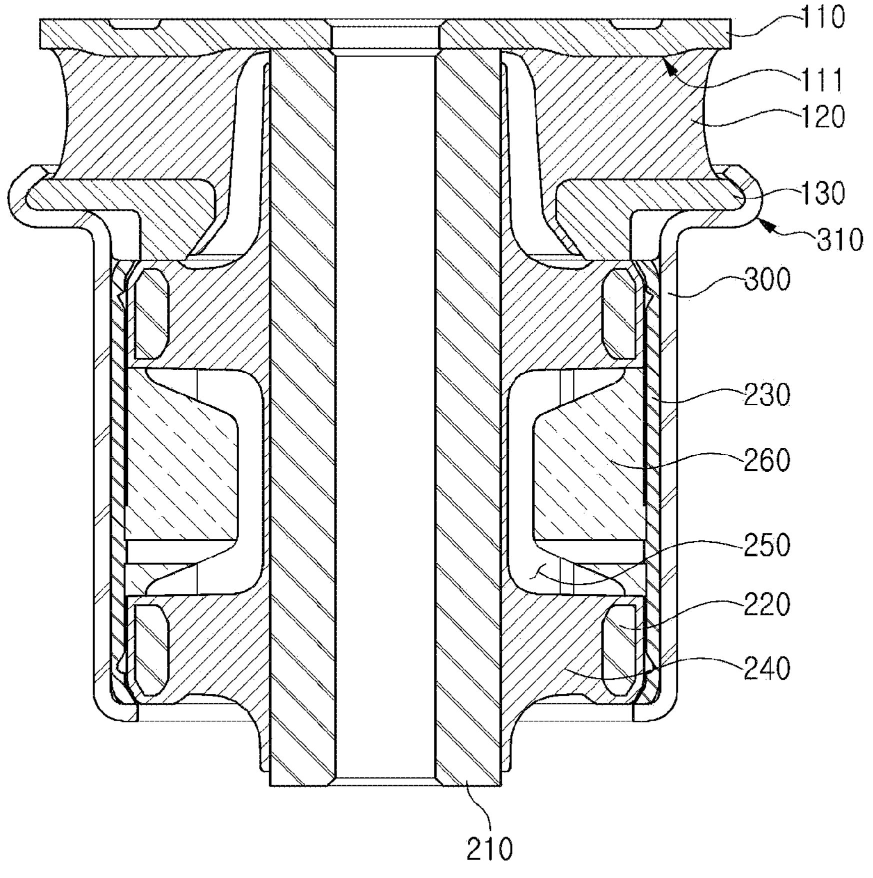
FIG. 3 is a cross-sectional view of FIG. 2, taken along line I-I'.

FIG. 2 is a perspective view of a hydro bushing according to an exemplary embodiment of the present disclosure, FIG. 3 is a cross-sectional view of FIG. 2, taken along line I-I'.

Figure 4:
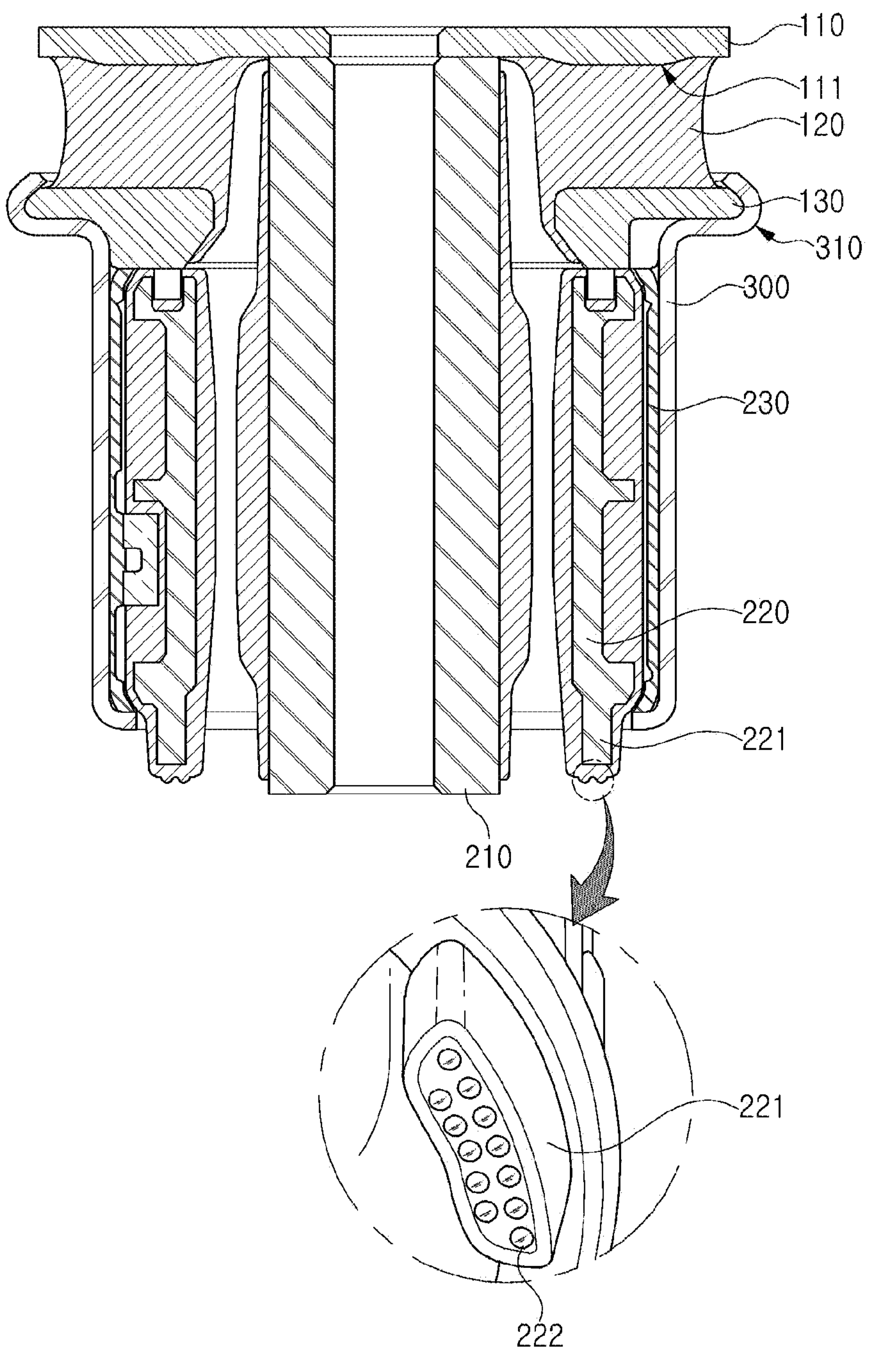
FIG. 4 is a cross-sectional view of FIG. 2, taken along line II-II'.
Figure 5:
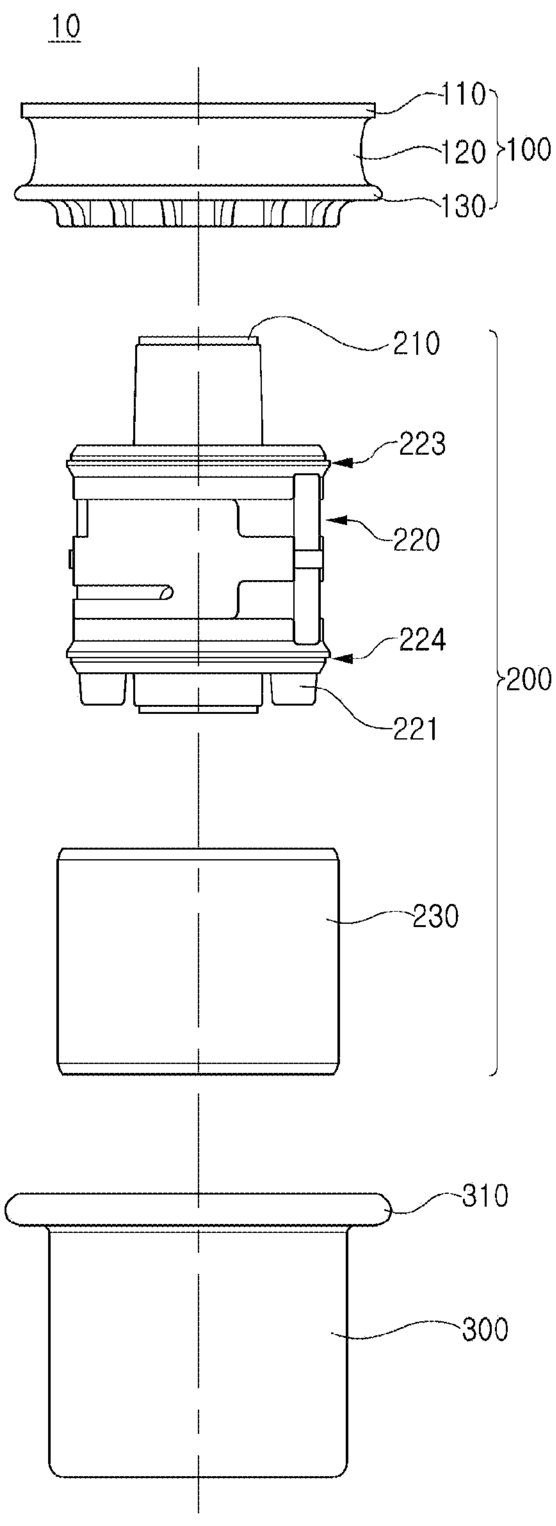
FIG. 5 is an exploded view of a hydro bushing according to an exemplary embodiment of the present disclosure.

FIG. 4 is a cross-sectional view of FIG. 2, taken along line II-II', and FIG. 5 is an exploded view of a hydro bushing according to an exemplary embodiment of the present disclosure.

Referring to FIG. 2, FIG. 3, FIG. 4 and FIG. 5, a hydro bushing 10 according to an exemplary embodiment of the present disclosure may include a side stopper 100, a main body 200, and a housing 300.

The side stopper 100 may include an upper plate 110, a lower plate 130, and a shock absorber 120 provided between the upper plate 110 and the lower plate 130. The side stopper 100 may include a toroid shape including a hole in a center portion thereof.

The upper plate 110 may be a circular plate including a hole in a center portion thereof. The hole in the center portion may be at least smaller than an external diameter of an internal pipe 210. At least a portion of the upper plate 110 may not have a constant thickness in a section between an external circumference and an internal circumference. For example, the internal circumference and the external circumference in the upper plate 110 may have approximately the same thickness, and in the section between the internal circumference and the external circumference, the upper plate 110 may protrude downwardly from a lower surface thereof joined to the shock absorber 120, to have a relatively thick thickness. In the instant case, a portion protruding from the lower surface of the upper plate 110 may be referred to as a first protrusion 111. Because the upper plate 110 includes the first protrusion 111, effects of more securely coupling the shock absorber 120 to the lower surface of the upper plate 110 and increasing stiffness against shocks in left and right directions may be effectuated. Furthermore, because the upper plate 110 includes the first protrusion 111, hardness of the shock absorber 120 may be reduced. As the hardness of the shock absorber 120 is reduced, an effect of buffering the side stopper 100 may increase. Therefore, noise, vibrations, and harshness (NVH) performance of the hydro bushing 10 may be improved.

The lower plate 130 may be formed to oppose the upper plate 110, and like the upper plate 110, may include a toroid shape including a hole in a center portion thereof. Unlike the internal hole of the upper plate 110, the internal hole of the lower plate 130 may be greater than the external diameter of the internal pipe 210. An upper surface of the lower plate 130 may be coupled to the shock absorber 120. The upper surface of the lower plate 130 may be coupled to the shock absorber 120 at a predetermined interval from an external circumference thereof. A surface of the external circumference of the lower plate 130 may be connected to surround a curled portion 310 including a "U" shape in the housing 300, which is described later.

The shock absorber 120 may be provided between the upper plate 110 and the lower plate 130. Like the upper plate 110 and the lower plate 130, the shock absorber 120 may have a toroid shape including a hole in a center portion thereof. Also, unlike the internal hole of the upper plate 110, the internal hole of the shock absorber 120 may be greater than the external diameter of the internal pipe 210. The shock absorber 120 may be formed of a material having predetermined elasticity, such as rubber or a synthetic resin.

The main body 200 may include an internal pipe 210, a middle pipe 220, an external pipe 230, and an anti-vibration unit 240.

The internal pipe 210 may be coupled to the anti-vibration unit 240 on an external side surface thereof, and may have a hollow shape to be coupled to a frame of the vehicle body. One side of the internal pipe 210 may protrude as long as a thickness of the side stopper 100 so that the internal pipe 210 is inserted into and coupled to the side stopper 100, and is coupled to the anti-vibration unit 240. The internal pipe 210 may be coupled to the housing 300, in a state in which the internal pipe 210 is inserted into the internal hole of the side stopper 100, and the side stopper 100 may be fixed to the vehicle body, together with the main body 200. In the instant case, the internal pipe 210 may be formed to protrude as long as the sum of a thickness of the lower plate 130 of the side stopper 100 and a thickness of the shock absorber 120, and may be inserted into the side stopper 100. For example, the internal pipe 210 may protrude so that a surface of an end portion of the internal pipe 210 inserted into the side stopper 100 is in contact with the upper plate 110 of the side stopper 100. When a length of the internal pipe 210 to be protruded is longer than the sum of the thickness of the lower plate 130 and the thickness of the shock absorber 120 in the side stopper 100, the end portion of the internal pipe 210, when coupled to the side stopper 100, may apply a force to push the upper plate 110 in an outward direction so that the upper plate 110 is deformed or contact between the upper plate 110 and the shock absorber 120 is weakened. When a length of the internal pipe 210 to be protruded is narrower than the sum of the thickness of the lower plate 130 and the thickness of the shock absorber 120 in the side stopper 100, in a distance in which the end portion of the internal pipe 210 and the upper plate 110 are spaced from each other, the internal pipe 210 may move relatively freely until the internal pipe 210 comes into contact with the upper plate 110 so that performance of the side stopper 100 and performance of the hydro bushing 10 may deteriorate in the spaced distance.

The anti-vibration unit 240 may be provided between the internal pipe 210 and the middle pipe 220, and may be formed of a material such as rubber or a synthetic resin, having elasticity, to absorb shock and vibration generated from the side stopper 100 or the internal pipe 210. Furthermore, the anti-vibration unit 240 may form a liquid chamber 250 for supporting displacement of the internal pipe 210, to absorb the shock and the vibration generated from the internal pipe 210 more effectively and stably join with the internal pipe 210. The anti-vibration unit 240 may further include a movement limiting unit 260, in a space in which the liquid chamber 250 and the internal pipe 210 are spaced from each other, to prevent a breakdown of the liquid chamber 250 by excessive displacement of the internal pipe 210. The movement limiting unit 260 may be inserted into the space formed by the liquid chamber 250 to support the liquid chamber 250, to secure a damping force of the liquid chamber 250. The movement limiting unit 260 may be provided between the anti-vibration unit 240 and the internal pipe 210, to prevent the excessive displacement of the internal pipe 210 and support the internal pipe 210 in the liquid chamber 250 at the same time so that shock and vibration are smoothly absorbed.

The middle pipe 220 may include an opening corresponding to the liquid chamber 250, and the opening may pass through the middle pipe 220. An upper swaging 223 and a lower swaging 224, bent outward, may be formed on both end portions of the middle pipe 220 in a longitudinal direction thereof. The upper swaging 223 and the lower swaging 224 may be formed to include an annular shape in a circumferential direction of the middle pipe 220.

An auxiliary stopper 221 may be further included on one side of the middle pipe 220. The auxiliary stopper 221 may be provided on the one side of the middle pipe 220 in a direction, opposing the side stopper 100. The auxiliary stopper 221 may control displacement, together with the side stopper 100, when a heavy load acts on the hydro bushing 10. The side stopper 100 and the auxiliary stopper 221 may control the displacement from both sides, to reduce a load of the shock absorber 120 and improve durability of the hydro bushing 10.

In the instant case, the auxiliary stopper 221 may further include a plurality of second protrusions 222 protruding to have a shape, similar to embossment. As described above, the auxiliary stopper 221 may further include a second protrusion 222 including a plurality of protruded portions such as embossment. The auxiliary stopper 221 may improve the durability of the hydro bushing 10, but may generate noise such as allophone or the like due to friction with the vehicle body, or the like, to reduce noise, vibration, and harshness (NVH) performance of the hydro bushing 10. The second protrusion 222 may be further included in the auxiliary stopper 221, to include an effect of reducing the generation of noise to improve the NVH performance of the hydro bushing 10.

The external pipe 230 may be coupled to the middle pipe 220 through an internal side surface thereof, and may have a hollow cylindrical shape. The external pipe 230 may be in an internal contact with the upper swaging 223 and lower swaging 224 of the middle pipe 220, to seal the middle pipe 220. The external pipe 230 may seal the middle pipe 220 so that fluid is stored between the external pipe 230 and the internal pipe 210, and the fluid moves between an inside and an outside of the middle pipe 220. In the instant case, the external pipe 230 may be coupled to an assembly of the internal pipe 210 and the middle pipe 220 in a state in which the external pipe 230 is submerged in the fluid (e.g., a damping oil) of the hydro bushing 10. For example, instead of separately injecting the fluid after assembling the hydro bushing 10, the fluid may be stored in the main body 200 by coupling the external pipe 230 in a state in which the fluid is contained therein. Furthermore, the hydro bushing 10 may be provided by coupling the main body 200 and the side stopper 100 in which the fluid is stored, through the housing 300, to improve performance of sealing the fluid by the hydro bushing 10.

The housing 300 may be formed as a hollow cylinder, and may couple the side stopper 100 and the main body 200. In the housing 300, a lower hollow hole may be smaller than the external diameter of the external pipe 230 of the main body 200, and an upper hollow hole may be smaller than the external diameter of the lower plate 130 of the side stopper 100. The housing 300 may further include a curled portion 310 bent in a "U" shape. The curled portion 310 formed along a circumferential surface on one side of the housing 300 may press the lower plate 130 toward the main body 200 to couple the side stopper 100 and the main body 200, in a state in which an edge portion of the lower plate 130 having a hollow disk shape is disposed on an internal side of the "U" shape.

In a conventional hydro bushing 10, a side stopper 100 may be directly coupled through an internal pipe 210, but a hydro bushing 10 according to an exemplary embodiment of the present disclosure may have a configuration in which the side stopper 100 and the main body 200 are formed separately and the side stopper 100 and the main body 200 are restrained by the housing 300. Therefore, the side stopper 100 and the main body 200 may be formed of separate materials, or may be designed to conform each characteristic, and may be then assembled through the housing 300. For example, when a conventional hydro bushing 10 increases hardness of a material of a shock absorber 120 to increase durability of a side stopper 100, a main body 200 including an internal pipe 210 to be integrally formed may be also affected to lower NVH or to transmit a crack in the shock absorber to the main body 200. In particular, in the shock absorber 120, an increase in durability may conversely deteriorate the NVH performance. Therefore, there may be a problem occurring in inverse proportion to each other. In a hydro bushing 10 according to an exemplary embodiment of the present disclosure, the side stopper 100 and the main body 200 may be separately manufactured, and the side stopper 100 and the main body 200 may be coupled through the housing 300, not to transmit a crack of the side stopper 100 to the main body 200. A hydro bushing 10 according to an exemplary embodiment of the present disclosure may improve durability and NVH performance at the same time, as the side stopper 100 and the main body are separately designed. For example, the NVH performance may be improved by use of a material of high elasticity for the shock absorber 120 of the side stopper 100, and the durability may be improved by use of a material resistant to fatigue, as a material of the main body 200.

According to an exemplary embodiment of the present disclosure, because a side stopper and a main body of a separable hydro bushing are improved, respectively, the side stopper and the main body may be designed and combined according to characteristics of a vehicle.

Furthermore, according to an exemplary embodiment of the present disclosure, a crack generated in a side stopper may not propagate to a main body.

Furthermore, according to an exemplary embodiment of the present disclosure, noise, vibration, and harshness (NVH) performance may be improved by enhancing performance of a side stopper and performance of a main body.

For convenience in explanation and accurate definition in the appended claims, the terms "upper", "lower". "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A hydro bushing comprising:

a main body configured for absorbing shocks using a sealed fluid;

a side stopper including a shock absorber and having a hollow cylindrical structure; and a housing fixing the side stopper and the main body, wherein the main body and the side stopper are separable from each other, wherein the main body includes:

a hollow cylindrical internal pipe including an anti-vibration unit configured for absorbing vibrations;

an external pipe surrounding the internal pipe and sealing the fluid in an internal space formed with an external surface of the internal pipe; and a middle pipe forming a movement path of the fluid therein, wherein the middle pipe is in an internal contact with the internal pipe, and is in an external contact with the external pipe.

2. The hydro bushing of claim 1, wherein the side stopper includes an upper plate and a lower plate, wherein the shock absorber is disposed and coupled between the upper plate and the lower plate, and wherein the upper plate, the lower plate, and the shock absorber form an internal hole.

3. The hydro bushing of claim 2, wherein an upper surface of the lower plate is coupled to the shock absorber at a predetermined interval from an external circumference thereof.

4. The hydro bushing of claim 2, wherein the internal pipe of the main body is formed to protrude to one side thereof, and wherein a protrusion of the internal pipe is inserted into the internal hole of the side stopper.

5. The hydro bushing of claim 4, wherein the internal pipe protrudes as long as a sum of a thickness of the lower plate of the side stopper and a thickness of the shock absorber.

6. The hydro bushing of claim 4, wherein the internal hole of at least one of the upper plate, the lower plate, or the shock absorber includes a diameter, different from a diameter of a remaining internal hole.

7. The hydro bushing of claim 4, wherein a diameter of the internal hole formed in the lower plate and the shock absorber is at least wider than an external diameter of the internal pipe.

8. The hydro bushing of claim 7, wherein the diameter of the internal hole formed in the upper plate is narrower than the external diameter of the internal pipe.

9. The hydro bushing of claim 2, wherein the upper plate further includes a first protrusion protruding toward the shock absorber on a portion of a lower surface in the upper plate.

10. The hydro bushing of claim 9, wherein an internal circumference and an external circumference in the upper plate have a same thickness, and in a section of the upper plate between the internal circumference and the external circumference, the upper plate protrudes downwardly from the lower surface thereof joined to the shock absorber, to have a thickness thicker than a remaining portion of the upper plate.

11. The hydro bushing of claim 1, wherein the housing further includes a curled portion bent in a "U" shape surrounding a surface of an external circumference of a lower plate of the side stopper.

12. The hydro bushing of claim 1, wherein the middle pipe forms an upper swaging and a lower swaging, bent outward, on first and second end portions of the middle pipe in a longitudinal direction of the middle pipe, and wherein the upper swaging and the lower swaging are in an internal contact with the external pipe.

13. The hydro bushing of claim 1, wherein the middle pipe further includes an auxiliary stopper protruding onto an opposite side of the side stopper.

14. The hydro bushing of claim 13, wherein the auxiliary stopper further includes a second protrusion.

15. The hydro bushing of claim 14, wherein the second protrusion includes an embossment.

16. The hydro bushing of claim 1, further including a movement limiting unit provided between the anti-vibration unit and the internal pipe, to support the internal pipe in a liquid chamber of the anti-vibration unit.

17. The hydro bushing of claim 1, wherein the anti-vibration unit of the main body and the shock absorber of the side stopper are formed of different materials.

* * * * *